US008420175B2

(12) United States Patent
Hayashi et al.

(10) Patent No.: US 8,420,175 B2
(45) Date of Patent: Apr. 16, 2013

(54) COMPOSITION CONTAINING CRYSTALLINE CELLULOSE COMPOSITE

(75) Inventors: Yuji Hayashi, Tokyo (JP); Yukio Yamawaki, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 221 days.

(21) Appl. No.: 12/995,234

(22) PCT Filed: Jun. 8, 2009

(86) PCT No.: PCT/JP2009/060428

§ 371 (c)(1), (2), (4) Date: Nov. 30, 2010

(87) PCT Pub. No.: WO2009/151018

PCT Pub. Date: Dec. 17, 2009

(65) Prior Publication Data

US 2011/0081495 A1 Apr. 7, 2011

(30) Foreign Application Priority Data

Jun. 9, 2008 (JP) ................................. 2008-150036
Jun. 11, 2008 (JP) ................................. 2008-152472

(51) Int. Cl.
*B05D 3/02* (2006.01)

(52) U.S. Cl.
USPC ..................... 427/385.5; 427/407.1; 427/415; 524/31

(58) Field of Classification Search ........................ None
See application file for complete search history.

(56) References Cited

U.S. PATENT DOCUMENTS

| | | | | |
|---|---|---|---|---|
| 7,094,448 | B2 * | 8/2006 | Ono et al. | 427/427.4 |
| 2010/0178332 | A1 | 7/2010 | Kakizawa et al. | |
| 2010/0209504 | A1 | 8/2010 | Yaginuma et al. | |
| 2011/0062630 | A1 | 3/2011 | Honda et al. | |

FOREIGN PATENT DOCUMENTS

| | | |
|---|---|---|
| JP | 63-137967 | 6/1988 |
| JP | 5-132644 | 5/1993 |
| JP | 5-163445 | 6/1993 |
| JP | 6-136693 | 5/1994 |
| JP | 2006-45248 | 2/2006 |
| JP | 2006-111699 | 4/2006 |
| JP | 2007-197520 | 8/2007 |
| JP | 2008-38056 | 2/2008 |

OTHER PUBLICATIONS

International Search Report for PCT/JP2009/060428, mailed Sep. 1, 2009.

* cited by examiner

*Primary Examiner* — Erma Cameron

(74) *Attorney, Agent, or Firm* — Greenblum & Bernstein, P.L.C.

(57) ABSTRACT

Disclosed is a composition containing 100 parts by mass of a pigment, 0.01-50 parts by mass of a cellulose composite and water. The composition has a solid content of more than 25% by mass, and a viscosity of not less than 30 mPa·S. The cellulose composite contains 0.5-50% by mass of a hydrophilic polymer having an acid value of not less than 2.0 and a weight average molecular weight of from $1\times10^3$ to $1\times10^7$ and 50-99.5% by mass of a crystalline cellulose. The cellulose composite has an average particle diameter of not more than 10 μm.

10 Claims, No Drawings

COMPOSITION CONTAINING CRYSTALLINE CELLULOSE COMPOSITE

TECHNICAL FIELD

The present invention relates to a highly stable composition, which hardly causes sagging or popping, even though spray coating or baking is carried out while the composition is used as a coating material, and which provides good interface control when a wet-on-wet coating is carried out.

BACKGROUND ART

Conventionally, the sedimentation, fixing and separation of water-insoluble products (mainly, a pigment) in a water dispersion of a pigment, such as a coating material or an ink, have been problematic. In addition, from the viewpoint of recent environmental issues and VOC control, the use of an aqueous coating material, in which a part or the entire of organic solvent has been substituted with water, has been promoted to achieve low pollution. However, in the case of such an aqueous coating material, usable stabilizers are limited. Thus, such an aqueous coating material has been problematic in that it has poor stability in comparison with a solvent-type coating material. In order to solve the aforementioned problem, in general, a thickener has been used to achieve high viscosity. However, in order to achieve both coatability and smoothness, extremely precise viscosity control has been necessary. On the other hand, as a product having a relatively low viscosity enabling the prevention of pigment sedimentation, the prevention of pigment fixing, and the conferring of redispersibility to a pigment, a technique using cellulose or a cellulose composite has already been known. For example, Patent Document 1 describes a pigment-dispersed paste used for electrodeposition coating materials, in which a cellulose composite is used, and an electrodeposition coating composition using the pigment-dispersed paste. Patent Document 2 discloses that the storage stability of an inorganic pigment is improved using a microcrystalline cellulose. Patent Document 3 discloses an aqueous resin coating material that contains an atomized cellulose and can be applied to spray coating. Patent Document 4 discloses a technique for using crystalline cellulose in an ink composition for the purpose of preventing the sedimentation of a pigment.

CITATION LIST

Patent Documents

PATENT DOCUMENT 1: JP 2006-111699 A
PATENT DOCUMENT 2: JP 5-132644 A
PATENT DOCUMENT 3: JP 5-163445 A
PATENT DOCUMENT 4: JP 2006-45248 A

SUMMARY OF INVENTION

Problems to be Solved by the Invention

With regard to the prior art techniques, it has been disclosed that dispersion stability can be imparted to a pigment with the use of a cellulose composite. However, such a cellulose composite has been used for electrodeposition coating, coating with a brush, or in a coating material to be dried naturally. The use of such a cellulose composite in a method comprising spray coating and the subsequent baking operation has not been reported. Prevent ion of popping and sagging is a problem to be solved in this coating method. That is to say, in the case of electrodeposition coating, a target is immersed in an electrodeposition bath containing a dilute coating material having a solid content of approximately 20% by mass, and a voltage is then applied thereto to previously form an electrodeposition coating film. Thereafter, the electrodeposition coating film is baked, so that it is reinforced. Since such an electrodeposition coating film has previously been formed, sagging or popping that may cause problems in the case of a coating material involving spray coating and baking, and particularly sagging, may cause almost no problems in the above described method. In addition, when in the case of drying at a room temperature, the coating material can be sufficiently stabilized with an ordinary thickener, and thus, sagging or popping does not cause big problems. However, when the coating material is used in baking coating, since the viscosity of a thickener is decreased at a high temperature, the viscosity needs to be increased to such an extent that it does not degrade workability in order to prevent sagging or popping. It has been desired to easily obtain a composition, which achieves the dispersion stability of a pigment and which hardly causes sagging or popping although spray coating and baking are carried out. However, whether or not such an object can be achieved using a crystalline cellulose composite, and if such an object can be achieved, what type of crystalline cellulose composite can be used, have been totally unknown so far. This is because smoothness has been extremely important for intermediate coating such as primer surfacer and topcoating, and it has been generally thought that a material having an average particle size of approximately 10 μm, such as crystalline cellulose, is not preferable. Moreover, since such a crystalline cellulose is constituted with insoluble particles, there is a fear that the clogging of a spray gun may occur. Furthermore, cost increases may also occur. As described above, the control of a viscosity is necessary, but with the use of a thickener, the sedimentation of a pigment and the occurrence of sagging or popping have been able to be sufficiently prevented. Thus, a new prescription should be studied, and persons skilled in the art generally have avoided using the crystalline cellulose composite having the aforementioned disadvantages for coating materials used in intermediate coating such as primer surfacer and/or topcoating.

On the other hand, a multilayer coating is generally carried out for purposes, in which stability is required over a long period of time, such as automobiles. In this case, an electrodeposition coating is first performed to prevent ingot from rusting. However, in the case of performing such electrodeposition coating, the convexoconcave of the ingot apparently comes out, and there is no smoothness. Moreover, in a case in which only the electrodeposition coating is performed, it is highly likely that the coating film is peeled off and that the ingot is rusted from the peeled portion. Hence, in order to acquire smoothness and chipping resistance, an intermediate coating such as primer surfacer is further carried out. Furthermore, for the purpose of imparting a designing property and weather resistance, a topcoating is performed after the intermediate coating such as primer surfacer (wherein two layers, namely, a base coat and a top coat, are generally formed). Previously, there has been generally applied a three-coat two-bake coating system comprising performing an intermediate coating such as primer surfacer, then once performing a baking operation to complete a coating film, then forming a base coat and a top coat as a topcoating, and then further performing a baking operation. However, as a result of the recent increasing awareness of environmental issues, a method comprising performing a topcoating without baking the intermediate coating layer and then performing a baking operation in one time has been proposed. Specifically, a three-coat one-bake (3WET) coating system involving a wet-on-wet coating is considered to be safer for the environment. However, a new problem has risen from the three-coat one-bake coating system. That is, when such wet-on-wet coating is performed, an intermediate coating layer is mixed with a topcoating layer at the interface, and as a result, the finished appearance may be degraded, or chipping resistance may become poor. In particular, since an aqueous coating material has a high latent heat in water and it takes a long time to dry the coating material, it has been considered more difficult.

Specifically, it is an object of the present invention to provide a highly stable composition, which hardly causes sagging or popping, even though spray coating or baking is carried out while the composition is used as an aqueous coating material, and surprisingly, which is able to suppress the mixing of layers at the interface when a wet-on-wet coating is performed.

Means for Solving the Problems

As a result of intensive studies directed towards achieving the aforementioned object, the present inventors have found that: a composition having a high dispersion stability of a pigment can be obtained with the use of a cellulose composite consisting of a specific hydrophilic polymer and a crystalline cellulose; and that when a coating material comprising said composition, a synthetic resin and a hardening agent, in which the composition having the solid content of more than 25% by mass, and a viscosity of 30 mPa·s or more is prepared, the coating material is excellent in terms of storage stability and hardly causes sagging or popping when spray coating and baking are carried out, and surprisingly, the coating material suppresses the mixing of layers at the interface when a wet-on-wet coating is performed, and further the coating material has good appearance and exhibits chipping resistance. In addition, the inventors have also found that a coating material or an ink can be more easily produced by making the above described cellulose composite a readily dispersible cellulose composite. Based on these findings, the inventors have completed the present invention. Specifically, the present invention is as follows:

(1) A composition comprising 100 parts by mass of a pigment, 0.01 to 50 parts by mass of a cellulose composite and water, wherein the composition has a solid content of more than 25% by mass and a viscosity of 30 mPa·s or more, and wherein the cellulose composite contains 0.5% to 50% by mass of a hydrophilic polymer having an acid value of 2.0 or more and a weight-average molecular weight of $1\times10^3$ to $1\times10^7$ and 50% to 99.5% by mass of a crystalline cellulose, and the average particle size of the cellulose composite is 10 μm or less.

(2) The composition according to (1), further comprising a synthetic resin and a hardening agent.

(3) The composition according to (2), wherein the synthetic resin is an anionic synthetic resin.

(4) The composition according to (2), wherein the synthetic resin is a polyester resin and the hardening agent is a melamine resin.

(5) The composition according to (1), wherein the average particle size of the cellulose composite according to (1) is 10 μm or less when measured in the form of a water dispersion of the cellulose composite having a solid content concentration of 1% that is prepared by dispersing the cellulose composite in water using a propeller stirrer equipped with four paddle blades each having a radius of 4 cm at 25° C. at 500 rpm for 20 minutes, and the thixotropic index (TI value) of the cellulose composite is 4 or more when measured in the form of a water dispersion of the cellulose composite prepared under the same conditions as above except that the solid content concentration is set at 2%.

(6) The composition according to (5), comprising 50 to 3000 parts by mass of a dispersion aid with respect to 100 parts by mass of a cellulose composite.

(7) The composition according to (6), further comprising a synthetic resin and an additive.

(8) The composition according to (7), wherein the synthetic resin is a film-forming resin.

(9) A coating method comprising performing a multilayer coating by wet-on-wet coating and then performing baking, wherein the composition according to any one of (1) to (8) is used for a lower layer and/or an upper layer.

(10) The coating method according to (9), which is a three-coat one-bake coating.

(11) A coating additive comprising a cellulose composite, wherein the average particle size of the cellulose composite is 10 μm or less when measured in the form of a water dispersion of the cellulose composite having a solid content concentration of 1% that is prepared by dispersing the cellulose composite in water using a propeller stirrer equipped with four paddle blades each having a radius of 4 cm at 25° C. at 500 rpm for 20 minutes, and the thixotropic index (TI value) of the cellulose composite is 4 or more when measured in the form of a water dispersion of the cellulose composite prepared under the same conditions as above except that the solid content concentration is set at 2%.

Advantageous Effects

According to the present invention, it is possible to provide a highly stable composition, which hardly causes sagging or popping, even though spray coating or baking is carried out while the composition is used as an aqueous coating material, and which provides good interface control when wet-on-wet coating is carried out. Furthermore, it is possible to more easily provide the above described composition by using a readily dispersible cellulose composite.

MODE FOR CARRYING OUT THE INVENTION

The present invention will be described in detail below. The composition of the present invention comprises: a cellulose composite having an average particle size of 10 μm or less, which consists of 0.5% to 50% by mass of a hydrophilic polymer having an acid value of 2.0 or more and a weight-average molecular weight of $1\times10^3$ to $1\times10^7$, and 50% to 99.5% by mass of a crystalline cellulose; a pigment; and water. The solid content of the composition exceeds 25% by mass, and the viscosity thereof is 30 mPa·s or more.

Moreover, the composition of the present invention further comprises a synthetic resin and a hardening agent, and it is preferably used as a coating material. The composition of the present invention can be preferably used in a cookie-type coating material, in which a coating film is formed by a baking step of promoting hardening by applying heat. The baking temperature applied to this coating material is adjusted, as appropriate, depending on the type of a resin or an additive used. In order to acquire sufficient coating physical properties, in general, the baking treatment is carried out preferably at 100° C. to 200° C., more preferably at 110° C. to 180° C., and most preferably at 120° C. to 160° C. The baking time is adjusted, as appropriate, depending on the baking temperature. In order to acquire sufficient coating physical properties, the baking time is preferably 5 minutes or more.

The upper limit is not particularly limited. From the viewpoint of the time required for a hardening reaction and the energy required for baking, it is generally 60 minutes or less. In a case in which heating is performed for a long period of time to form a coating film, naturally, sagging or popping may easily occur. However, the composition of the present invention has greatly advantageous effects in that it is able to suppress the generation of such sagging or popping even in a heating time of more than 5 minutes.

The composition of the present invention has a viscosity of 30 mPa·s or more. If the viscosity is less than 30 mPa·s, sagging may easily occur during a spray coating. The viscosity is preferably 60 mPa·s or more, and more preferably 100 mPa·s or more. The upper limit is not particularly limited. It is generally $10^5$ mPa·s or less. The term “viscosity” is used herein to mean a viscosity obtained by measuring at 60 rpm using a type B viscometer and a rotor suitable depending on the type of a coating material.

The hydrophilic polymer of the present invention preferably has an acid value of 2.0 or more and a weight-average molecular weight of $1\times10^3$ to $1\times10^7$. If the acid value is less than 2.0, the dispersion stability of the pigment is degraded. Moreover, the stability of the coating material is also degraded, and further, sagging or popping easily occurs. Interface control during a wet-on-wet coating also tends to be degraded. The acid value of the hydrophilic polymer is more preferably 5 or more, and further preferably 9 or more. The upper limit is not particularly limited. It is preferably 100 or less. If the acid value is 100 or less, when the composition is used as a coating material, it is hardly aggregated with a resin component contained in the coating composition. The term “acid value” is used herein to mean the mg amount of KOH necessary for neutralizing acids contained in 1 g of a hydrophilic polymer. Moreover, the hydrophilic polymer of the present invention preferably has a weight-average molecular weight of $1\times10^3$ to $1\times10^7$. If the weight-average molecular weight is less than $1\times10^3$, two layers tend to be easily mixed at the interface during a wet-on-wet coating. On the other hand, if it exceeds $1\times10^7$, there may be a case in which the surface smoothness of the coating film is impaired. The weight-average molecular weight of the present hydrophilic polymer is more preferably $5\times10^4$ to $9\times10^6$. The molecular weight of the hydrophilic polymer can be obtained by an ordinary method such as GFC.

Examples of such a hydrophilic polymer include: carboxymethylcellulose and a salt thereof; xanthan gum; karaya gum; carrageenan; gum Arabic; glucomannan; gellan gum; alginic acid and a salt thereof; and an ester body such as alginic acid propylene glycol ester.

The term “crystalline cellulose” is used in the present invention to mean crystalline cellulose having an average degree of polymerization of 30 to 400 and comprising more than 10% of a crystalline portion, which is obtained by subjecting a cellulose material such as a wood pulp or a purified linter to a depolymerization treatment such as acid hydrolysis, alkali oxidation decomposition, or enzymolysis.

The cellulose composite of the present invention consists of 0.5% to 50% by mass of a hydrophilic polymer and 50% to 99.5% by mass of a crystalline cellulose. The cellulose composite of the present invention is obtained, for example, by mixing the crystalline cellulose and the hydrophilic polymer within the above described ratio and then subjecting the mixture to wet grinding, followed by drying and crushing. The term “cellulose composite” is used in the present invention to mean a cellulose composite, which has an average particle size of 10 μm or less when a sample is dispersed in pure water to become a sample concentration of 1% by mass using Excel autohomogenizer (ED-7; manufactured by Nippon Seiki Co., Ltd.) at 15000 rpm for 5 minutes, and thereafter, a value at which the accumulated volume becomes 50% is read by Laser Scattering Particle Size Distribution Analyzer (LA-910; manufactured by Horiba, Ltd.) and the obtained value is defined as an average particle size, and in which no clear precipitation occurs although the above described dispersion is left for 30 minutes. For example, when the above described components are simply mixed with one another to form powders, the powders cannot be sufficiently dispersed in water by the above described dispersion method, and a precipitation may occur, or an average particle size may exceed 10 μm. In such a case, the obtained product is not a cellulose composite, but it is a simple mixture of a crystalline cellulose and a hydrophilic polymer. The cellulose composite of the present invention has an average particle size of 10 μm or less according to the above described measurement method when it is dispersed in the above-mentioned manner. Taking into consideration the smoothness of a coating film prepared from the present cellulose composite used as a coating material, it is necessary for the cellulose composite to have an average particle size of 10 μm or less. On the other hand, the smaller the average particle size, the higher the effect of preventing sagging that can be obtained when a coating material is sprayed, and further, the smoothness of a coating film may also be improved. For interface control during a wet-on-wet coating, it is adequate that the average particle size of the cellulose composite is not so small. That is, the average particle size is preferably 4 μm or more, and more preferably 7 μm or more.

If the hydrophilic polymer is contained at less than 0.5% by mass, the dispersion stability of the composition tends to be degraded. In contrast, if it exceeds 50% by mass, popping is likely to occur in the coating material. Thus, the content of the hydrophilic polymer in the composite is more preferably 1% to 30% by mass, and most preferably 5% to 20% by mass.

Moreover, the cellulose composite of the present invention may comprise components other than the hydrophilic polymer and the crystalline cellulose. For example, it may comprise 5% to 30% by mass of water-soluble molecules of dextrins such as roasted dextrin, hydrolyzed starch or Pullulan; sugars such as xylose, glucose, fructose, sucrose, trehalose, cello-oligosaccharide, xylo-oligosaccharide, fructo-oligosaccharide, galacto-oligosaccharide or raffinose; or sugar alcohols such as xylitol, mannitol or erythritol. Differing from the case of the after-mentioned readily dispersible cellulose composite, in a method for mixing components other than the hydrophilic polymer and the crystalline cellulose, such as dextrins, the mixture does not need to be homogenized using a high-pressure homogenizer, a high-speed stirrer or the like. Simple powder mixing may also be adequate.

Furthermore, a readily dispersible cellulose composite, the dispersibility of which has been improved to such a level that it can be dispersed with a propeller stirrer, may further comprise 50 to 3000 parts by mass of, preferably 100 to 2000 parts by mass of, and more preferably 200 to 1000 parts by mass of a dispersion aid, with respect to 100 parts by mass of the crystalline cellulose composite.

When such a readily dispersible cellulose composite is produced, a cellulose composite may be previously produced, or individual components of the cellulose composite may be mixed with a dispersion aid to produce the readily dispersible cellulose composite. As for the mixing of individual components, all the components may be mixed simultaneously, or they may be mixed one by one. The ratio between the hydrophilic polymer and the crystalline cellulose is as described above. The cellulose composite used in a readily dispersible cellulose preferably comprises a somewhat higher amount of water-soluble polymer. Specifically, a cellulose composite comprising 5% by mass or more of a hydrophilic polymer is preferable. In addition, if 50 parts by mass or more of a dispersion aid is contained, sufficient dispersibility is obtained. If the content of the dispersion aid is 3000 parts by mass or less, a large amount of additive is not necessary for the cellulose composite to exhibit its functions.

The type of a dispersion aid used herein is not particularly limited, as long as it is easily soluble in water. Examples of such a dispersion aid include: dextrins such as roasted dextrin or hydrolyzed starch; sugars such as xylose, glucose, fructose, sucrose, trehalose, cello-oligosaccharide, fructo-oligosaccharide, galacto-oligosaccharide or raffinose; sugar alcohols such as xylitol, mannitol or erythritol; amino acids such as aspartic acid, glutamic acid, lysine, arginine, histidine, glycine, alanine, valine, leucine, isoleucine, serine, threonine, cysteine, methionine, asparagine, glutamine, proline, phenylalanine, tyrosine or tryptophan; water-soluble salts such as citrate or sodium chloride. Of these, water-soluble sugars are preferable. In terms of safety and productivity, dextrin having DE (the saccharification degree of starch) of 5 to 40 is particularly preferable. A single type of, or a mixture of several types of the dispersion aids as described above, can be used. However, high dispersibility cannot be achieved only by the powder mixing of individual components. In order to achieve high dispersibility in the present invention, it is important to uniformly mix the three components. Thus, it is preferable to disperse individual components in water and to uniformly mix them in the presence of the water using a high-pressure homogenizer, a high-speed stirrer, or various types of mills. For example, there is preferably applied a production method, which comprises: mixing a crystalline cellulose with a hydrophilic polymer by a wet grinding method using a mill or the like; dispersing the obtained wet cake in water; adding a dispersion aid to the water dispersion; homogenizing the dispersion using a high-pressure homogenizer; and then drying the obtained suspension using a spray drier or the like. Alternatively, a commonly available crystalline cellulose composite (e.g. CEOLUS RC-N30 (trade name) (manufactured by Asahi Kasei Chemicals Corporation)) or the like may be purchased, and it may be then mixed with a dispersion aid by the above described method, so as to produce a readily dispersible cellulose composite.

The high-pressure homogenizer used herein is an apparatus for carrying out crushing, dispersion and emulsification, utilizing a shearing force obtained by pressurizing a raw material (a liquid, or a liquid and a solid) and allowing the material to pass through a space (slit). Examples of such a high-pressure homogenizer include Nanomizer (trade name) (manufactured by Nanomizer Inc.), Microfluidizer (trade name) (manufactured by Microfluidics), Ariete (trade name) (Niro Soavi), APV homogenizer (trade name) (APV), and so on.

The readily dispersible cellulose composite of the present application is the above defined cellulose composite, which has an average particle size of 10 μm or less according to the after-mentioned dispersion method and a thixotropic index (TI value) of 4 or more. The above described average particle size is defined as an average particle size, which is obtained when a cellulose composite and deionized water are added in an amount necessary for sufficient stirring, such as 700 ml/L beaker, to a commonly used 1- to 2-L stainless steel beaker, so as to prepare a dispersion of 1-mass-% corresponding to cellulose, and they are then dispersed in water at 25° C. at 500 rpm for 20 minutes using a propeller stirrer equipped with four paddle winds each having a radius of 4 cm. Such an average particle size is 10 μm or less, preferably 8 μm or less, and more preferably 6 μm or less. When the average particle size exceeds 10 μm, since the dispersion of a crystalline cellulose composite is not sufficient, the dispersion stability or redispersibility of a pigment may not be sufficient. In addition, there may be a case in which the sedimentation of the cellulose composite itself may occur. The lower limit is not particularly limited. When a weak dispersion is carried out as described above, it is preferably 1 μm or more. It is adequate even if the radius of the paddle blade used herein may slightly differ from the above described size (4 cm). For example, a MAZELA (trade name) NZ-1000 series four-blade angle fan having a blade diameter of 80 mm, or a Three-One Motor general-purpose stirring blade square cross (radius, 35 mm) may be used.

The term "thixotropic index (TI value)" is used in the present invention to mean the ratio between the static viscosity of a dispersion at 6 rpm and that at 60 rpm, which is obtained by adding a cellulose composite and deionized water to a 1- to 2-L vessel according to the same method as above except that a dispersion having a dispersion concentration of 2-mass-% corresponding to cellulose is prepared, then dispersing them in water at 25° C. at 500 rpm for 20 minutes using a propeller stirrer equipped with four paddle blades each having a radius of 4 cm, then measuring the viscosity of the obtained dispersion using a type B viscometer, rotor No. 1, at 25° C., and then leaving the dispersion for 3 hours. It is defined by the formula: TI value=viscosity at 6 rpm/viscosity at 60 rpm. In this measurement, it is preferable that two samples have previously been prepared, and that the viscosities at 6 rpm and at 60 rpm of each sample be measured. The higher the TI value, the higher the structural viscosity and the less sagging can be achieved. As a result, a composition with excellent storage stability can be obtained. The TI value of the dispersion obtained by performing the above described operations on the readily dispersible cellulose composite of the present invention is preferably 4 or more, more preferably 5 or more, and most preferably 6 or more. If the TI value is 4 or more, storage stability may not be degraded. The upper limit is not particularly limited. The TI value of an ordinary cellulose composite is 20 or less.

Both an ordinary cellulose composite and a readily dispersible cellulose composite may be used for the composition of the present invention. In a case in which dispersion equipment is maintained, it is better to use such an ordinary cellulose composite because of cost effectiveness. On the other hand, in a case in which only a disperser with a low shearing force is prepared, then the readily dispersible cellulose composite should be used. Hereinafter, the term "(readily dispersible) cellulose composite" will be used to mean both an ordinary cellulose composite and a readily dispersible cellulose composite.

The absolute value of the zeta potential of the (readily dispersible) cellulose composite of the present invention is preferably 30 mV or more. The zeta potential used herein is a value obtained by dispersing a crystalline cellulose composite in pure water to prepare a dispersion having a dispersion concentration of 0.5% corresponding to cellulose, then measuring the zeta potentials of the dispersion with a zeta-potential electrometer (ELSZ; manufactured by Otsuka Electronics Co., Ltd.) in the range from pH 2 to 12, and then adopting the greatest absolute value. Generally, the zeta potential becomes the maximum in the range from pH 5 to 8. The absolute value of the zeta potential of a (readily dispersible) cellulose composite is preferably 30 mV or more, more preferably 50 mV or more, and further preferably 60 mV or more. Generally, the (readily dispersible) cellulose composite of the present invention is negatively charged. If the absolute value of the zeta potential is 30 mV or more, the effects of the present invention are sufficiently obtained.

The type of a pigment used in the present invention is not particularly limited. The form of such a pigment is not particularly limited, either, and a platy, spherical or scale-like pigment or the like can be used. Examples of such a pigment include: anticorrosive pigments such as zinc chromate, lead chromate, minium, zinc phosphate, vanadium phosphate, calcium phosphate, aluminum molybdophosphate, calcium molybdate, aluminum tripolyphosphate, bismuth oxide, bismuth hydroxide, basic bismuth carbonate, bismuth nitrate, bismuth silicate, hydrotalcite, zinc powder or micaceous iron oxide; extenders such as calcium carbonate, barium sulfate, alumina white, silica, diatomaceous earth, kaoline, talc, clay, mica, baryta, organic bentonite or white carbon; color pigments such as titanium dioxide, flower of zinc, antimony oxide, lithopone, white lead, carbon black, iron black, metal complex black oxide, perylene black, molybdate orange, cadmium red, red iron oxide, cerium sulfate, chrome yellow, cadmium yellow, yellow iron oxide, yellow earth, bismuth yellow, sienna, amber, green earth, Mars violet, ultramarine blue, iron blue, basic lead sulfate, basic lead silicate, zinc sulfate, antimony trioxide, a calcium complex, phthalocyanine blue, phthalocyanine green or ocher; metal powder pigments such as aluminum powder, copper powder, brass powder or stainless steel powder; nacreous pigments including metal oxide-coated mica such as titanium oxide-coated mica or iron oxide-coated mica; and pigments with special functions, such as zinc copper oxide, silver particles, anatase-type titanium oxide, iron oxide burned pigment, conductive metal powder or electromagnetic wave absorption ferrite. These pigments can be used singly or as a mixture of two or more types. The primary average particle size of such a pigment is preferably 10 μm or less, and more preferably 5 μm or less. If the primary average particle size is 10 μm or less, there is no possibility that dispersion stability is decreased or the smoothness of a coating film is impaired. The lower limit is not particularly limited. The size of a commonly available ultrafine pigment is approximately 10 nm. Examples of a pigment that is particularly preferable as a coating material of the present application include carbon black, titanium white, titanium dioxide, talc, clay, kaoline, and so on.

When the composition of the present invention is used as an aqueous coating material, all raw materials may be mixed simultaneously to produce such an aqueous coating material. However, it is preferable to produce a pigment-dispersed paste by previously mixing a pigment with a (readily dispersible) cellulose composite.

It is preferable to mix a pigment with a cellulose composite in the presence of water, using a disperser involving a grinding force, such as an SG mill, a ball mill or an attritor. Using the above described disperser involving a grinding force, functions can be efficiently added to the mixture, while solving the secondary aggregation of the pigment, and thus, such a disperser is preferable. With regard to the mixing ratio between a pigment and a cellulose composite, 0.01 to 50 parts by mass of the cellulose composite is preferably used with respect to 100 parts by mass of the pigment. When a disperser involving a grinding force cannot be used, a readily dispersible cellulose composite is used. The amount of such a readily dispersible cellulose composite added to the pigment is the same as in the case of an ordinary cellulose composite, if the additive amount of the readily dispersible cellulose composite is calculated by corresponding to the cellulose composite. That is to say, in a case in which a dispersion aid is contained, the necessary amount of the readily dispersible cellulose composite is increased by the amount of the dispersion aid. Moreover, in this case, a readily dispersible cellulose composite, in which a pigment has previously been dispersed, is preferably used. If the amount of the (readily dispersible) cellulose composite is less than 0.01 parts by mass, the conferring of stability during pigment dispersion is insufficient, and the storage stability of a coating material, in which the composition is used, is degraded. In addition, the effect of suppressing sagging or popping during spraying and the interface control function in wet-on-wet coating are hardly obtained. Even if the amount of the (readily dispersible) cellulose composite exceeds 50 parts by mass, the effect of the present invention may not be improved, and thus, the (readily dispersible) cellulose composite may be wasted. The amount of the (readily dispersible) cellulose composite is more preferably 0.1 to 40 parts by mass, and further preferably 0.3 to 30 parts by mass.

Moreover, during the mixing operation, the mixture preferably comprises 10% by mass or more to less than 75% by mass of water with respect to the total solid content. The amount of water contained is more preferably 20% to 60% by mass. When 10% by mass or more of water is mixed, it is able to sufficiently solve the secondary aggregation of the pigment, and there is no possibility that unevenness occurs on a coating film. If the amount of water contained is 75% by mass or more, the productivity is unfavorably decreased. In the above described operations, one or several types of additives, such as a pigment disperser, a surfactant, a hardening agent, an antifoaming agent, an organic solvent, a thixotropic agent, a resin and an iridescent material, may also be comprised, as necessary. In particular, when a highly hydrophobic organic pigment is used, a disperser such as a surfactant is preferably used in combination.

When the composition of the present invention is used as a coating material, a pigment-dispersed composition, in which a pigment dispersed so that the content (total solid content) of the pigment can be preferably 0.5% to 50% by mass, more preferably 1% to 45% by mass, and further preferably 2% to 40% by mass, with respect to the total amount of the coating material, is mixed with a synthetic resin, a hardening agent, and as necessary, water, and other additives. If the content of the pigment is 0.5% by mass or more, sufficient storage stability, the smoothness of a coating film, and hiding power can be obtained. If it is 50% by mass or less, the amounts of resin and water are not relatively decreased, and there are no possibility that a film-forming property and flowability are degraded. Moreover, it may also be possible that a composition, in which a (readily dispersible) cellulose composite and/or a pigment have previously been dispersed, is not prepared, but a crystalline cellulose, a hydrophilic polymer and/or a (readily dispersible) cellulose composite, a synthetic resin, a hardening agent, water, and as necessary, other additives are mixed to obtain a (readily dispersible) cellulose composite and/or a pigment-dispersed paste, and at the same time to obtain a coating material.

As a synthetic resin used in the coating material of the present invention, for example, an aqueous acrylic resin, a denatured acrylic resin, an aqueous urethane resin, an aqueous acrylic urethane resin, an aqueous vinyl chloride resin, an aqueous vinyl acetate resin, an aqueous epoxy resin, an aqueous polyester resin, an aqueous alkyd resin, or an aqueous polyamide resin can be used.

Furthermore, a synthetic polymer emulsion can be used as such a synthetic resin. Examples of such a synthetic polymer emulsion include a styrene-butadiene-based copolymer latex, a polystyrene-based polymer latex, a polybutadiene-based polymer latex, an acrylonitrile-butadiene-based copolymer latex, a polyurethane-based polymer latex, a polymethyl methacrylate-based polymer latex, a methyl methacrylate-butadiene-based copolymer latex, a polyacrylate-based polymer latex, a vinyl chloride-based polymer latex, a vinyl acetate-based polymer emulsion, a vinyl acetate-ethylene-based copolymer emulsion, a polyethylene emulsion, a carboxy denatured styrene butadiene copolymer resin emulsion, an acrylic resin emulsion, and so on.

In particular, an anionic synthetic resin is preferable as the synthetic resin in the present invention. In the case of a cationic synthetic resin, seeding may be easily generated. Among anionic synthetic resins, an aqueous polyester resin or an aqueous alkyd resin is preferably used. Naturally, these resins may be denatured.

Examples of a hardening agent used in the present invention include an amino resin (a melamine resin) and a block polyisocyanate compound. Naturally, these resins may be denatured.

Among these hardening agents, at least one hardening agent is used in the coating material of the present invention. In terms of the physical properties of a coating film, particularly preferably, a polyester resin is used as a synthetic resin, and a melamine resin is used as a hardening agent.

Examples of a monomer constituting the above described resin include: aliphatic conjugated dienes such as butadiene, isoprene or 2-chlor-1,3-butadiene; aromatic vinyl compounds such as styrene, α-methylstyrene or vinyltoluene; methacrylic acid alkyl esters such as methyl methacrylate, ethyl methacrylate or butyl methacrylate; acrylic acid alkyl esters such as ethyl acrylate, butyl acrylate or 2-ethylhexyl acrylate; vinyl cyanide compounds such as acrylonitrile or methacrylonitrile; and vinyl acetate, vinyl chloride, vinylidene chloride, urethane, ethylene, and so on. Moreover, as other copolymerizable monomers, 2-hydroxyethyl acrylate, 2-hydroxyethyl methacrylate, glycyl methacrylate, N-methylolacrylamide, N-butoxymethylacrylamide, acrylamide, sodium styrenesulfonate, and ethylene unsaturated carboxylic acids such as itaconic acid, fumaric acid, acrylic acid, methacrylic acid or crotonic acid, are used, as necessary.

With regard to the total amount of a synthetic resin in a coating material, preferably 80 to 500 parts by mass of, more preferably 150 to 450 parts by mass of, and most preferably 200 to 400 parts by mass of the synthetic resin is desirably used with respect to 100 parts by mass of the (total) solid content of a pigment in the coating material. If the mass ratio of the synthetic resin is 80 parts by mass or more, there is no possibility that it affects flowability or a film-forming property. In addition, if it is 500 parts by mass or less, there is no case in which color unevenness and the like occur.

Furthermore, the composition of the present invention may further comprise an additive, as necessary. Examples of such an additive include: amino group-containing epoxy resins such as tertiary amine type; pigment dispersers such as a quaternary ammonium salt-type epoxy resin, a quaternary ammonium salt-type resin or a surfactant; antifoaming agents such as polydimethylsiloxane, a denatured silicone compound or fatty acid ester; thickeners such as a polyacrylic acid polymer, polyamide, organic clay, hydroxyethylcellulose or carboxymethylcelluose; organic tin compounds such as dibutyl tin laurate, dibutyl tin oxide, dibutyl tin oxide, dioctyl tin oxide or dibutyl tin dibenzoate; amines such as N-methylmorpholine; hardening catalysts such as metal salts of lead acetate, strontium, copper, cobalt, etc.; antiseptics such as organic copper, organic tin, organic halogen, phenol or an amine compound; light resistance improvers and/or ultraviolet absorbers such as benzophenone, benzothiazole, anilide oxalate, a hindered amine compound, a phenol compound or a thioether compound; antistatic agents such as an anionic surfactant, a cationic surfactant, a nonionic surfactant, conductive carbon or conductive metal powder; reaction suppressants such as an amine compound (an amino resin coating material) or hydroquinone (oxidation polymerization, radical hardening coating material); blocking agents such as a lactam compound, an oxime compound, aliphatic alcohols, aromatic alkyl alcohols or an ether alcohol compound; neutralizers such as sodium hydroxide, potassium hydroxide, lithium hydroxide, diethanolamine, triethanolamine, N-methylaminoethanol, 2-amino-2-methylpropanol, N,N-dimethylaminoethanol, formic acid, acetic acid or lactic acid; fire retardants such as halogen, an organic phosphorus, an antimony compound or magnesium hydroxide; delustering agents including polymer beads such as finely-divided silica, urea, urethane or acryl; scratch preventers and/or anti-adhesive agents such as polyethylene wax, paraffin wax or fluorine wax; color separation-preventing agents such as silicone oil; wetting agents such as a surfactant, alkyl phosphoric acid ester or polyamide; and organic solvents such as alcohols. If necessary, one type of, or two or more types of additives selected from the above-mentioned additives are used in appropriate amounts depending on intended use and/or functions.

A more specific example of the above described organic solvent is a solvent consisting of one type, or two or more types selected from among hydrocarbons, alcohols, polyhydric alcohols, the derivatives of such polyhydric alcohols, ketones, esters and carbonates.

Examples of such hydrocarbons include xylene, toluene, hexane, cyclohexane, mineral spirit, turpentine oil, solvent naphtha, and so on. Examples of such alcohols include methanol, ethanol, n-propanol, n-butanol, n-pentanol, n-hexanol, n-heptanol, n-octanol, n-nonyl alcohol, n-decanol, n-undecanol or isomers thereof, cyclopentanol, cyclohexanol, and so on. Alcohols having an alkyl carbon number of 1 to 6 are preferable.

Examples of such polyhydric alcohols include ethylene glycol, propylene glycol, 1,3-butylene glycol, 1,4-butylene glycol, 1,5-pentanediol, neopentyl glycol, 1,6-hexanediol, 1,2-cyclohexanediol, 1,7-heptanediol, 1,8-octanediol, 1,9-nonanediol, 1,10-decanediol, glycerin, pentaerythritol, and so on.

Examples of the derivatives of such polyhydric alcohols include ethylene glycol monomethyl ether, ethylene glycol monoethyl ether, ethylene glycol monopropyl ether, ethylene glycol isopropyl ether, ethylene glycol monobutyl ether, ethylene glycol isobutyl ether, propylene glycol monomethyl ether, propylene glycol monoethyl ether, propylene glycol monopropyl ether, propylene glycol monobutyl ether, cellosolve acetate, and so on.

Examples of such ketones include acetone, methyl ethyl ketone, methyl butyl ketone, methyl isobutyl ketone, diisopropyl ketone, cyclopentanone, cyclohexanone, and so on.

Examples of such esters include methyl acetate, ethyl acetate, propyl acetate, isopropyl acetate, butyl acetate, isobutyl acetate, amyl acetate, lactic acid ester, butyric acid ester, dibutyl phthalate, dioctyl phthalate, cyclic esters such as s-caprolactone or ϵ-caprolactam, and so on.

Examples of such ethers include diethyl ether, isopropyl ether, n-butyl ether, tetrahydrofuran, tetrahydropyrane, 1,4-dioxane, and so on.

Examples of such carbonates include dimethyl carbonate, diethyl carbonate, ethylmethyl carbonate, ethylene carbonate, and so on.

The composition of the present invention is preferably used as a coating material in spray coating. The solid content thereof exceeds 25% by mass. It is more preferably 30% by mass or more, and further preferably 35% by mass or more. If the solid content is 25% by mass or less, sagging may be easily generated after spraying, and further, since it contains a large amount of volatile component, it takes a long time to dry it. The upper limit is preferably less than 85% by mass, in terms of spraying workability.

The coating of the present invention can be carried out by various methods. In order to accentuate the effects of the present invention, a spray coating is particularly preferable. The type of such spray coating is not particularly limited. For example, an air spray coating, an airless spray coating, and an electrostatic spray coating can be applied. The type of a spraying device used is not particularly limited, either. For example, a low-pressure spray gun, an automatic spray gun, an air brush, a long-neck spray gun, a spider web gun, a bell-type coating machine, a disk-type coating machine, and so on can be applied. As in the case of the spray coating, a shower coating is often problematic in terms of sagging, and thus the shower coating is considered to have the same meanings as those of the spray coating in the present invention. Basic materials to be coated are selected, depending on purpose, from among architectures, construction materials, structures, ships, fishing nets, automobiles, electronic components, metals, plastics, machines, railroads, air crafts, woodworks, house furnishings, pavement markers, leathers and the like. Examples of such a basic material to be coated include a metal, a wood, a resin, a glass, a cement, an asphalt, a soil, and so on. The composition of the present invention is preferably used as an aqueous coating material for architectures and construction materials, an aqueous coating material for automobiles, an aqueous coating materials for shipping steel plates, an aqueous material for cans, a coating material for PCM, or a coating material used to treat organic surfaces. The composition of the present invention is particularly preferably used as an aqueous coating material for the primer surfacer of automobiles.

Further, the composition of the present invention is particularly suitable for a step of performing a wet-on-wet coating and then performing a baking operation. The “wet-on-wet coating” means a method, in which a step of baking a lower layer is omitted when a multilayer coating is performed on two or more layers, and an upper layer is directly coated in a wet state. Since such a baking step can be decreased, this method has effects such as the reduction of environmental burden and energy. However, the improvement of the interface control of a wet interface is required. By using the composition of the present application as a lower layer and/or an upper layer to be coated by a wet-on-wet coating, the mixing of the layers at the interface can be suppressed, namely, the interface can be controlled. The number of layers coated by a wet-on-wet coating method is not particularly limited. However, a three-coat one-bake coating step is common, and the composition of the present invention is preferably used in this step.

Still further, among the fields of coating materials and inks, manufacturers of coating materials for construction materials generally use a high-speed impeller stirrer and the like. Thus, it is difficult to conduct dispersion using an ordinary cellulose composite. However, if the composition of the present invention can be dispersed under the above described dispersion conditions for defining a readily dispersible cellulose composite, in which dispersion is carried out at 25° C. at 500 rpm for 20 minutes using a propeller stirrer equipped with four paddle blades each having a radius of 4 cm (namely, a readily dispersible cellulose composite having an average particle size of 10 μm or less and having a TI value of 4 or more), it can be applied by almost all manufacturers of coating materials for construction materials or manufacturers for ink products. That is to say, it can be used for intended use which is hardly realized with an ordinary cellulose composite.

When the composition of the present invention is used for the intended use as an ink, said composition consists of a pigment-dispersed composition using a readily dispersible cellulose composite, a film-forming resin, and an additive. The above described pigment used for ink is not particularly limited. Any pigment can be selected from inorganic and organic pigments and can be then used. Further, inorganic fluorescent pigments and organic fluorescent pigments can also be used. Examples of such inorganic pigments include carbon black, titanium oxide, red iron oxide, chromium oxide, iron black, cobalt blue, iron oxide yellow, viridian, zinc sulfate, lithopone, cadmium yellow, vermilion, cadmium red, chrome yellow, molybdate orange, zinc chromate, strontium chromate, white carbon, clay, talc, ultramarine blue, calcium carbonate, white lead, iron blue, manganese violet, and so on. Examples of such organic pigments include azo lake, an insoluble azo pigment, a phthalocyanine pigment, a perylene-perinone pigment, an anthraquinone pigment, a quinacridone pigment, dye lake, a nitro pigment, a nitroso pigment, and so on.

Specifically, phthalocyanine blue (C. I. 74160), phthalocyanine green (C. I. 74260), Hansa yellow 3G (C. I. 11670), disazo yellow GR (C. I. 21100), permanent red 4R (C. I. 12335), brilliant carmine 6B (C. I. 15850), quinacridone red (C. I. 46500), and the like can be used. In addition, an example of an inorganic fluorescent pigment is a pigment obtained by adding a trace amount of activator such as copper, silver or manganese to high-purity heavy-metal salts such as zinc sulfate or the sulfide of alkali earth metal used as a raw material, and then sintering the mixture at a high temperature. Examples of an organic fluorescent pigment include a solid solution obtained by dissolving a fluorescent dye in a synthetic resin vehicle, or staining a dispersed body of fine resin particles obtained by performing emulsion polymerization, suspension polymerization or the like with a fluorescent dye. Such synthetic resins include a vinyl chloride resin, an alkyd resin, an alkali resin, and so on. As a fluorescent dye, C. I. acid yellow 7, C. I. basic red 1, etc. can be used. These pigments may be used singly or in combination of at least two or more types. The average particle size of such a pigment is preferably 10 μm or less, more preferably 5 μm or less, and most preferably 3 μm or less. If the average particle size is 10 μm or less, it does not cause a decrease in dispersion stability or clogging. The lower limit is not particularly limited. The size of a commonly available ultrafine particle pigment is approximately 10 nm. Moreover, it is also desired to prepare an ink by mixing the pigment-dispersed composition of the present invention, a resin, an additive, and as necessary, water, such that the (total) content of the pigment can be preferably 0.5% to 30% by mass, more preferably 2% to 30% by mass, and further preferably 5% to 15% by mass, with respect to the total mass of the ink. If the content of the pigment is 0.5% by mass or more, there is no possibility that the concentration of the ink is insufficient. If it is 30% by mass or less, writing feeling does not tend to be significantly heavy. It is also possible that a pigment-dispersed composition has not previously been prepared, but a pigment, a readily dispersible cellulose composite, a resin, an additive and water are mixed to obtain a pigment-dispersed composition, and that at the same time to obtain the ink of the present invention.

Examples of a film-forming resin used in the ink of the present invention include a styrene butadiene resin, an acryl nitrile butadiene resin, a carboxy denatured styrene butadiene copolymer resin, an acrylic resin, a rosin denatured phenol resin and a rosin denatured alkyd resin.

Moreover, as a film-forming resin used in the ink of the present invention, a resin emulsion is preferably used in terms of the easiness of the adjustment of ink viscosity and the like. Examples of such a resin emulsion include a styrene butadiene resin emulsion, an acryl nitrile butadiene resin emulsion, a carboxy denatured styrene butadiene copolymer resin emulsion, an acrylic resin emulsion, and so on. These resins are used singly or as a mixture of two or more types. The (total) content of the solid content of such a resin is preferably 10% to 50% by mass, more preferably 15% to 35% by mass, and further preferably 20% to 30% by mass, with respect to the total mass of the ink. If the content of the film-forming resin is 10% by mass or more, the film-forming property is not degraded, and there is no case in which clear printing cannot be performed. On the other hand, if it is 50% by mass or less, the stability of the ink does not tend to be degraded.

Examples of an additive used in the ink of the present invention include: wettability improvers such as lecithin, sorbitan, fatty acid ester or an alkylamine fatty acid salt; flowability adjusting agents such as a higher alcohol, an organic solvent, a surface activator or a gelling agent; antibacterial agents; antioxidants; ultraviolet absorbers; thickeners; organic solvents, and so on. These additives can be used singly or as a mixture of two or more types.

A more specific example of the above described organic solvent is a solvent consisting of one type, or two or more types selected from among hydrocarbons, alcohols, polyhydric alcohols, the derivatives of such polyhydric alcohols, ketones, esters and carbonates. From the viewpoint of safety and functions, polyhydric alcohols are particularly preferable.

Examples of such polyhydric alcohols include ethylene glycol, propylene glycol, 1,3-butylene glycol, 1,4-butylene glycol, 1,5-pentanediol, neopentyl glycol, 1,6-hexanediol, 1,2-cyclohexanediol, 1,7-heptanediol, 1,8-octanediol, 1,9-nonanediol, 1,10-decanediol, glycerin, pentaerythritol, and so on.

Examples of such hydrocarbons include xylene, toluene, hexane, cyclohexane, mineral spirit, turpentine oil, solvent naphtha, and so on.

Examples of such alcohols include methanol, ethanol, n-propanol, n-butanol, n-pentanol, n-hexanol, n-heptanol, n-octanol, n-nonyl alcohol, n-decanol, n-undecanol or isomers thereof, cyclopentanol, cyclohexanol, and so on. Alcohols having an alkyl carbon number of 1 to 6 are preferable.

Examples of the derivatives of such polyhydric alcohols include ethylene glycol monomethyl ether, ethylene glycol monoethyl ether, ethylene glycol monopropyl ether, ethylene glycol isopropyl ether, ethylene glycol monobutyl ether, ethylene glycol isobutyl ether, propylene glycol monomethyl ether, propylene glycol monoethyl ether, propylene glycol monopropyl ether, propylene glycol monobutyl ether, cellosolve acetate, and so on.

Examples of such ketones include acetone, methyl ethyl ketone, methyl butyl ketone, methyl isobutyl ketone, diisopropyl ketone, cyclopentanone, cyclohexanone, and so on.

Examples of such esters include methyl acetate, ethyl acetate, propyl acetate, isopropyl acetate, butyl acetate, isobutyl acetate, amyl acetate, lactic acid ester, butyric acid ester, dibutyl phthalate, dioctyl phthalate, and cyclic esters such as ϵ-caprolactone or ϵ-caprolactam.

Examples of such ethers include diethyl ether, isopropyl ether, n-butyl ether, tetrahydrofuran, tetrahydropyrane, 1,4-dioxane, and so on.

Examples of such carbonates include dimethyl carbonate, diethyl carbonate, ethylmethyl carbonate, ethylene carbonate, and so on.

The ink of the present invention has excellent storage stability, and is useful as an ink for the tools of writing such as a fountain pen, a ballpoint pen or a felt pen, or as an ink for ink-jet printing.

EXAMPLES

The present invention will be more specifically described in the following examples. However, these examples are not intended to limit the scope of the present invention. It is to be noted that measurement and evaluation were carried out as follows.

<Average Particle Size of Cellulose Composite>

(1) A sample was dispersed using Excel autohomogenizer (ED-7; manufactured by Nippon Seiki Co., Ltd.) at 15000 rpm for 5 minutes, to achieve the concentration of the sample of 1% by mass.

(2) A value at which the accumulated volume became 50% was read by Laser Scattering Particle Size Distribution Analyzer (LA-910; manufactured by Horiba, Ltd.), and the obtained value was defined as an average particle size.

<Measurement of Acid Value>

1 g of a sample (corresponding to the solid content) was precisely weighed, and approximately 200 ml of water was then added to the sample, so that the sample was dissolved therein. Thereafter, 5 ml of 0.05 mol/l sulfuric acid was added to the solution using a pipette, and the obtained mixture was heated at 95° C. for 10 minutes. Then, the reaction solution was cooled to a room temperature, and a phenolphthalein indicator was then added thereto. Thereafter, the mixture was titrated with 0.1 mol/l potassium hydroxide. At the same time, a blank test was carried out, and the amount (mg) of potassium hydroxide necessary for neutralizing an acid component was calculated from the difference between the results of the two tests.

<Average Molecular Weight>

The average molecular weight was analyzed by an ordinary method using a GFC column.

<Method for Evaluating Pigment-Dispersed Composition and Coating Material Composition>

Storage Stability 50 g of a prototype sample was weighed into a glass sample bottle, and this sample was then left in a 50° C. thermostatic chamber for 7 days. Thereafter, the sample bottle was gently removed from the chamber, and the stability over time was then evaluated in accordance with the below-mentioned evaluation standards.

⊚ (Excellent): Sedimentation separation is not observed, and no change is observed from the initial stage.

○ (Good): Sedimentation separation is observed at a moderate level, but almost no change is observed from the initial stage.

Δ (Fair): A supernatant is observed as a result of sedimentation separation, but the shape of the sediment is bulky.

X: (Fail): A clear supernatant can be confirmed as a result of sedimentation separation, and a complete sediment is observed.

Redispersibility

The above described sample, which had been left for 7 days, was shaken at a shaking width of approximately 10 cm at a speed of 2 times/sec. Thereafter, the state of the sample was observed.

⊚ (Excellent): The sample is immediately (within 10 seconds) returned to the state before the storage.

○ (Good): The sample is returned to the state before the storage, if it is shaken for 11 to 60 seconds.

Δ (Fair): Even if the sample is shaken for 60 seconds, a slight aggregate remains, although the sample attached to the wall surface is removed.

X: (Fail): Even if the sample is shaken for 60 seconds, the sample attached to the wall surface remains, or a clear aggregate remains.

Prevention of Color Separation

The above described sample, which had been left for 7 days, was shaken two times under the same conditions as those for the evaluation of redispersibility. Thereafter, the state of color separation was examined by visual observation.

○ (Good): Almost no color separation is observed.

Δ (Fair): A moderate level of color separation is observed.

X: (Fail): Complete color separation is observed.

Sagging (Coatability)

An aqueous coating composition was applied to a polished steel plate using a spray gun, followed by baking. Thereafter, the state of the obtained coating film was observed, so as to evaluate sagging.

◎ (Excellent): No sagging is observed during the spraying and baking operations.

○ (Good): No sagging is observed during the spraying operation, but slight sagging is observed during the baking operation.

Δ (Fair): Sagging is observed to a slight extent during the spraying operation.

X: (Fail): Sagging is completely generated, and unevenness is found on the coating film.

Popping (Smoothness)

The coating films, which had been formed under the conditions of each Example, were evaluated by visual observation in accordance with the below-mentioned evaluation standards.

○ (Good): The coating film is favorable.

Δ (Fair): The coating film is slightly degraded (with round).

X: (Fail): The coating film is unfavorable (roughly coated, like orange peel).

Finished Appearance

A case in which a wet-on-wet coating was carried out was compared with a case in which a baking operation was carried out on each layer by visual observation.

○ (Good): The coating films formed by the two above methods seem to be the same.

Δ (Fair): There seems to be somewhat difference between the coating films formed by the two above methods.

X: (Fail): There is apparently difference between the coating films formed by the two above methods.

Salt Tolerance

The coating surface of a test coating plate was crosscut by a cutter, and it was then left in a JIS-Z-2371 (or JIS-K5600) salt water spraying test for 192 hours (or 1000 hrs). Thereafter, the state of rust generation was observed.

○ (Good): No rust is generated.

Δ (Fair): Rust is partially generated.

X: (Fail): Rust is generated on the entire surface.

Weather Resistance

Weather resistance was examined for 1000 hours in accordance with JIS K5600. After completion of the examination, the following evaluation test was carried out.

A) Pencil Hardness Test

In accordance with JIS K5600, a pencil was pushed against the surface of a coating film, and the hardness of the coating film was examined.

○ (Good): No change is observed in the hardness, in comparison with the hardness before the test.

Δ (Fair): A change of 1 rank is observed in the hardness, in comparison with the hardness before the test.

X: (Fail): A change of 2 ranks or more is observed in the hardness, in comparison with the hardness before the test.

* "1 rank" means that the hardness is changed from H to 2H, for example.

B) Adhesiveness Test

In accordance with ASTM D-3359, a grid was formed on the coating film, an adhesive tape was then adhered to the surface of the coating film, and the adhesive tape was immediately removed. The adhesive force obtained at that time was examined.

○ (Good): No peeling is observed.

Δ (Fair): Peeling is partially observed.

X: (Fail): Peeling is observed on the entire surface of the coating film.

<Method for Evaluating Ink>

[Method for Evaluating Stability Over Time]

Each of the obtained inks was placed in a transparent container with a cover (30 ml), the container was then stored in a 50° C. thermostat, and it was then left for 2 weeks. Thereafter, the container was gently removed from the thermostat, and stability over time was evaluated in accordance with the following standards.

Evaluation Standards:

◎ (Excellent): No sedimentation separation is observed, and no change is observed from the initial stage.

○ (Good): A moderate level of sedimentation separation is observed, but almost no change is observed from the initial stage.

Δ (Fair): A supernatant is observed as a result of sedimentation separation, but the shape of the sediment is bulky.

X: (Fail): A clear supernatant can be confirmed as a result of sedimentation separation, and a complete sediment is observed.

[Method for Evaluating Stability of Viscosity Over Time]

Each ink was left at a room temperature (25° C.) or lower for 3 or more hours, so as to cool the ink to a room temperature (25° C.), and the viscosity of the ink was then measured at 25° C. at 60 rpm using a type B viscometer. The viscosity of the ink was evaluated in accordance with the below-mentioned standards. It is to be noted that the viscosity of the ink at the initial stage was also measured under the same conditions (25° C., 60 rpm).

Evaluation Standards:

◎ (Excellent): A change in viscosity from the initial stage is less than ±2%.

○ (Good): A change in viscosity from the initial stage is ±2% or more to less than 5%.

Δ (Fair): A change in viscosity from the initial stage is ±5% or more to less than 10%.

X: (Fail): A change in viscosity from the initial stage is ±10% or more.

<Thixotropic Index (TI Value)>

(1) A sample and pure water were weighed into a 2-L stainless steel beaker, and dispersed at 25° C. at 500 rpm for 20 minutes, using a propeller stirrer (Three-One Motor HEIDON (trade name) BL-600) equipped with general-purpose stirring blade square cross (radius, 35 mm) so as to prepare a water dispersion having a solid content concentration of 2% and a total amount of 1300 to 1700 ml.

(2) The obtained water dispersion was left at rest in a 25° C. atmosphere for 3 hours.

(3) A rotating viscometer (type B viscometer, rotor No. 1, manufactured by Tokimec) was set, and 30 seconds after setting the viscometer, the rotation of the rotor was initiated. Thereafter, the viscosity was calculated from the reading 30 seconds after the initiation of the rotation. The measurement was carried out in the order of the rotor rotation numbers of 6 rpm and 60 rpm. The value obtained by dividing the viscosity value at 6 rpm by the viscosity value at 60 rpm is a thixotropic index (TI value).

<Average Particle Size of Readily Dispersible Cellulose Composite>

(1) A dispersion was prepared in the same manner as in the case of obtaining a TI value at a sample concentration of 1-mass-%.

(2) A value (median diameter) at which the accumulated volume became 50% was read by Laser Scattering Particle Size Distribution Analyzer (LA-910; manufactured by Horiba, Ltd.) and the obtained value was defined as an average particle size.

Hereinafter, the present invention will be specifically described in the following Examples and Comparative Examples.

Example 1 and Comparative Examples 1 and 2

20.5 parts by mass of ethylene glycol, 12.9 parts by mass of trimethylolpropane, and 51.7 parts by mass of phthalic anhydride were mixed, and the mixture was then subjected to an esterification reaction at 180° C. for 5 hours. Thereafter, 14.9 parts by mass of trimellitic anhydride was further added to the reaction product, followed by a further reaction at 180° C. for 1 hour, so as to obtain a polyester resin. To this polyester resin, a melamine resin (Cymel 254; manufactured by Mitsui Scitec Corp.) was added, so as to achieve a ratio of the polyester resin/the melamine resin=70/30 (solid content ratio). The obtained mixture was stirred at 60° C. for 1 hour, and then neutralized with triethylamine. The obtained product was directly stirred at 60° C. for 15 minutes, and thereafter, deionized water was slowly added therein to obtain a solid content of 40% by mass, so as to obtain an aqueous varnish A.

A commercially available DP pulp was cut using a shredder, and the cut pulp was then subjected to a hydrolysis treatment in 1% by mass of hydrochloric acid at 105° C. for 60 minutes. The obtained acid-insoluble residue was filtrated and washed with pure water, so as to obtain a wet cake of crystalline cellulose. Karaya gum as a water-soluble polymer having an acid value of 28.6 and a weight-average molecular weight of $9\times10^6$, and dextrin, were added to the solid content of the above described wet cake to achieve a ratio of the crystalline cellulose/the karaya gum/the dextrin of 80/10/10 (the mass ratio of solid contents). The obtained mixture was kneaded and ground using a kneader. Thereafter, the resultant was dried and crushed, so as to obtain a cellulose composite A.

Thereafter, using an SG mill, 29 parts by mass of titanium dioxide, 2 parts by mass of carbon black, 10 parts by mass of barium sulfate, 5 parts by mass of talc, and I part by mass of the cellulose composite A were dispersed and mixed into 100 parts by mass of the solid content of the above described aqueous varnish A, so as to obtain a pigment-dispersed composition A.

An aqueous varnish A and a block isocyanate resin (TPA-B80E; solid content: 80% by mass; Asahi Kasei Chemicals Corp.) were added to the obtained pigment-dispersed composition A, to achieve the solid content of the pigment-dispersed composition A/the volatile component of the resin=24% by mass and a mass ratio of the main resin/the hardening agent=70/30, so as to obtain an aqueous baking coating composition A (total solid content: 49%).

Moreover, the above block isocyanate resin was added thereto to achieve the titanium oxide/the solid content of the aqueous varnish A=18% by mass and a mass ratio of the main resin/the hardening agent=70/30, so as to obtain an aqueous base coating material A. The aqueous baking coating composition A was applied by spray coating to a commercially available test steel plate to achieve a dried film thickness of approximately 30 μm, and the aqueous base coating material A was also applied by wet-on-wet coating thereto to achieve a dried film thickness of approximately 15 μm. The resultant was set for approximately 10 minutes, and it was then preliminarily heated at 100° C. for 10 minutes. Thereafter, the resultant was baked at 160° C. for 30 minutes, so as to obtain a coating film. As a control, an aqueous baking coating composition A was baked under the same conditions as described above, and an aqueous base coating material A was applied thereto, followed by baking. Thereafter, the aqueous baking coating composition A and the coating film thereof were evaluated. The evaluation results are shown in Table 1. Comparative Example 1 was carried out in the same manner as in Example 1 with the exception that crystalline cellulose was used instead of karaya gum during the preparation of a cellulose composite A. In Comparative Example 2, the coating material of Example 1 was diluted with pure water to achieve a solid content of 20% by mass, and the evaluation was carried out in the same manner as in Example 1.

Example 2 and Comparative Examples 3 and 4

A commercially available DP pulp was cut, and the cut pulp was then subjected to a hydrolysis treatment in 0.6% by mass of hydrochloric acid at 121° C. for 60 minutes. The obtained acid-insoluble residue was filtrated and washed with pure water, so as to obtain a wet cake of crystalline cellulose. Xanthan gum as a water-soluble polymer having an acid value of 9.5 and a weight-average molecular weight of $2\times10^6$, and dextrin, were added to the solid content of the above described wet cake to achieve a ratio of the crystalline cellulose/the xanthan gum/the dextrin of 75/5/20 (the mass ratio of solid contents). The obtained mixture was kneaded and ground using a kneader. Thereafter, the resultant was dried and crushed, so as to obtain a cellulose composite B.

Thereafter, using a ball mill, 42 parts by mass of titanium dioxide, 10 parts by mass of calcium carbonate, and 0.26 parts by mass of the cellulose composite B were mixed into 100 parts by mass of the solid content of the aqueous varnish A obtained in Example 1, so as to obtain a pigment-dispersed composition B.

An aqueous varnish A and a melamine resin (MYCOAT 212; manufactured by Mitsui Scitec Corp.) were added to the obtained pigment-dispersed composition B, to achieve the solid content of the pigment-dispersed composition B/the volatile component of the resin=18% by mass and a mass ratio of the main resin/the hardening agent=70/30, so as to obtain an aqueous baking coating composition B (total solid content: 40% by mass). The aqueous baking coating composition B was applied by air spray coating to a commercially available test plate coated with an electrodeposition coating film, to achieve a dried film thickness of approximately 20 μm. Thereafter, the aqueous base coating material A was also applied by wet-on-wet coating thereto to achieve a dried film thickness of approximately 15 μm. The resultant was set for approximately 8 minutes, and it was then preliminarily heated at 80° C. for 10 minutes. Thereafter, the resultant was baked at 130° C. for 40 minutes, so as to obtain a coating film. As a control, an aqueous baking coating composition B was baked under the same conditions as described above, and an aqueous base coating material A was applied thereto, followed by baking. Thereafter, the aqueous baking coating composition B and the coating film thereof were evaluated. The evaluation results are shown in Table 1. Comparative Example 3 was carried out in the same manner as in Example 2 with the exception that curdlan having an acid value of 0 and a weight-average molecular weight of $5.9\times10^5$ was used instead of xanthan gum to prepare a cellulose composite B. In Comparative Example 4, the coating material of Example 2 was diluted with pure water to achieve a solid content of 23% by mass, and the evaluation was carried out in the same manner as in Example 2.

Example 3 and Comparative Example 5

A commercially available DP pulp was cut, and the cut pulp was then subjected to a hydrolysis treatment in 0.5% by mass of hydrochloric acid at 115° C. for 60 minutes. The obtained acid-insoluble residue was filtrated and washed with pure water, so as to obtain a wet cake of crystalline cellulose. Carboxymethylcellulose sodium as a water-soluble polymer having an acid value of 2 and a weight-average molecular weight of $5\times10^4$ was added to the solid content of the above described wet cake to achieve a ratio of the crystalline cellulose/the carboxymethylcellulose sodium of 89/11 (the mass ratio of solid contents). The obtained mixture was kneaded and ground using a kneader. Thereafter, the resultant was dried and crushed, so as to obtain a cellulose composite C. Subsequently, 0.5 parts by mass of the cellulose composite C, 40 parts by mass of red iron oxide, and 59 parts by mass of deionized water were mixed, and the obtained mixture was then dispersed and mixed using an SG mill, so as to obtain a pigment-dispersed composition C (solid content: 41% by mass).

59 parts by mass of acrylic resin, 20 parts by mass of block isocyanate (Sumidule; manufactured by Asahi Kasei Chemicals Corporation), and 100 parts by mass of THF were added into a container, and the obtained mixture was then added to a mixed solution of 20 parts by mass of a pigment-dispersed composition C and 80 parts by mass of deionized water. The thus obtained mixture was mixed using a disperser. After completion of the mixing, the solvent was removed by decompression to such an extent that the volatile component became approximately 100 g. Thereafter, 0.1 parts by mass of triethylenediamine was added to the residue, so as to obtain an aqueous baking coating composition C (total solid content: 49% by mass).

The aqueous baking coating composition C was applied by spray coating to a commercially available test plate coated with an electrodeposition coating film, to achieve a dried film thickness of approximately 40 μm. Thereafter, the aqueous base coating material A was also applied by wet-on-wet coating thereto to achieve a dried film thickness of approximately 10 μm. The resultant was preliminarily heated at 60° C. for 10 minutes. Thereafter, the resultant was baked at 150° C. for 20 minutes, followed by drying, so as to obtain a coating film. As a control, an aqueous baking coating composition C was baked under the same conditions as described above, and an aqueous base coating material A was applied thereto, followed by baking. Thereafter, the aqueous baking coating composition C and the coating film thereof were evaluated. The evaluation results are shown in Table 1. Comparative Example 5 was carried out in the same manner as in Example 3 with the exception that carboxymethylcellulose sodium was used instead of crystalline cellulose.

Example 4 and Comparative Example 6

A commercially available DP pulp was cut, and the cut pulp was then subjected to a hydrolysis treatment in 0.65% by mass of hydrochloric acid at 126° C. for 60 minutes. The obtained acid-insoluble residue was filtrated and washed with pure water, so as to obtain a wet cake of crystalline cellulose. Carboxymethylcellulose sodium as a water-soluble polymer having an acid value of 2 and a weight-average molecular weight of $5\times10^4$, xanthan gum as a water-soluble polymer having an acid value of 9.5 and a weight-average molecular weight of $2\times10^6$, dextrin, and edible oil and fat (rapeseed oil) were added to the solid content of the above described wet cake to achieve a ratio of the crystalline cellulose/the carboxymethylcellulose sodium/the xanthan gum/the dextrin/the edible oil and fat (rapeseed oil) of 73/5/2.8/19/0.2 (the mass ratio of solid contents). The obtained mixture was kneaded and ground using a kneader. Thereafter, the resultant was dried and crushed, so as to obtain a cellulose composite D. Subsequently, 21.6 parts by mass of aqueous alkyd resin (Aqua Blue 48E; solid content: 50% by mass; manufactured by Showa Varnish Co., Ltd.), 60.0 parts by mass of titanium dioxide, 9.9 parts by mass of deionized water, 0.1 parts by mass of dimethylethanolamine, and 0.3 parts by mass of the cellulose composite D were dispersed for 1 hour using a ball mill, so as to obtain a pigment-dispersed composition D (solid content: 85% by mass).

50 parts by mass of the above described pigment-dispersed composition D, 40.2 parts by mass of an aqueous alkyd resin (Aqua Blue 48E; solid content: 50% by mass; manufactured by Showa Varnish Co., Ltd.), 0.1 parts by mass of diethylethanolamine, and 5.6 parts by mass of a melamine resin (Cymel 254; manufactured by Mitsui Scitec Corp.) were mixed using a paint shaker, so as to obtain an aqueous baking coating composition D (total solid content: 71% by mass).

The aqueous baking coating composition D was applied by spray coating to a commercially available test plate coated with an electrodeposition coating film, to achieve a dried film thickness of approximately 20 μm. Thereafter, the aqueous base coating material A was also applied by wet-on-wet coating thereto to achieve a dried film thickness of approximately 15 μm. The resultant was preliminarily heated at 80° C. for 10 minutes. Thereafter, the resultant was baked at 140° C. for 20 minutes, so as to obtain a coating film. As a control, an aqueous baking coating composition D was baked under the same conditions as described above, and an aqueous base coating material A was applied thereto, followed by baking. Thereafter, the aqueous baking coating composition D and the coating film thereof were evaluated. The evaluation results are shown in Table 1. In Comparative Example 6, individual components were neither kneaded nor ground using a kneader, but the mixed powders were used. Specifically, a wet cake of crystalline cellulose was dried and then crushed to prepare powders, and the powders of individual components and edible oil and fat were placed in a plastic bag at the above described mixing ratio, and they were then fully shaken to obtain the mixed powders. The thus obtained mixed powders were used.

TABLE 1

| | | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Evaluation of coating material | Storage stability | ◎ | ○ | ◎ | ◎ | Δ | X | Δ | X | X | X |
| | Redispersibility | ◎ | ◎ | ◎ | ◎ | Δ | ◎ | Δ | ◎ | X | Δ |
| | Sagging (coatability) | ◎ | ◎ | ◎ | ◎ | X | X | Δ | Δ | Δ | X |
| Evaluation of coating film | Popping (smoothness) | ○ | ○ | Δ | ○ | Δ | X | Δ | X | X | X |
| | Finished appearance | ○ | ○ | ○ | ○ | Δ | X | Δ | X | Δ | X |
| | Salt tolerance | ○ | ○ | ○ | ○ | Δ | X | Δ | X | Δ | X |
| | Weather resistance (hardness test) | ○ | ○ | ○ | ○ | Δ | X | Δ | X | Δ | Δ |
| | Weather resistance (adhesiveness test) | ○ | ○ | ○ | ○ | X | X | Δ | X | Δ | Δ |

Production Example 1

A commercially available DP pulp (with an average degree of polymerization of 850) was cut, and the cut pulp was then subjected to a hydrolysis treatment in 1% hydrochloric acid at 110° C. for 60 minutes. The obtained acid-insoluble residue was filtrated and washed with pure water, so as to obtain a wet cake of crystalline cellulose. Xanthan gum and dextrin were added to the solid content of the above described wet cake to achieve a ratio of the cellulose/the xanthan gum/the dextrin of 75/5/20 (the mass ratio of solid contents). The obtained mixture was kneaded and ground using a kneader. The obtained wet cake of cellulose composite was added to 80° C. hot water to achieve a solid content concentration of 15% by mass, and it was then dispersed therein. Thereafter, trehalose was added to the dispersion to achieve a ratio of the cellulose/the trehalose of 60/40 (the mass ratio of solid contents), and the thus obtained mixture was further stirred for 20 minutes. The dispersion-dissolved solution was subjected to a grinding treatment by one pass at a pressure of 15 MPa using a high-pressure homogenizer (manufactured by APV). Thereafter, the resultant was spray-dried under conditions of an inlet temperature of 90° C. to 100° C. and an outlet temperature of 70° C. to 80° C., using a spray dryer, so as to obtain a readily dispersible cellulose composite α. A dispersion of the readily dispersible cellulose composite α had an average particle size of 7 μm and a TI value of 4.2.

Production Example 2

10 kg of 60° C. hot water was prepared. While gently stirring the hot water, 0.5 kg of a dry state of cellulose composite (CEOLUS RC-N81 (trade name); manufactured by Asahi Kasei Chemicals Corporation) consisting of 80% by mass of crystalline cellulose, 10% by mass of karaya gum, and 10% by mass of dextrin was added thereto. Thereafter, 3 kg of dextrin (Pine-Dex #3 (trade name); manufactured by Matsutani Chemical Industry Co., Ltd.) was added thereto, and the obtained mixture was further stirred for 20 minutes. This dispersion-dissolved solution was subjected to a grinding treatment by one pass at a pressure of 20 MPa using a high-pressure homogenizer (manufactured by APV). Thereafter, the resultant was spray-dried under conditions of an inlet temperature of 90° C. to 100° C. and an outlet temperature of 70° C. to 80° C., using a spray dryer, so as to obtain a readily dispersible cellulose composite β. A dispersion of the readily dispersible cellulose composite β had an average particle size of 9 μm and a TI value of 6.0.

Production Example 3

10 kg of 60° C. hot water was prepared. While gently stirring the hot water, 1.37 kg of a dry state of cellulose composite (CEOLUS RC-N81 (trade name); manufactured by Asahi Kasei Chemicals Corporation) consisting of 80% by mass of crystalline cellulose, 10% by mass of karaya gum, and 10% by mass of dextrin was added thereto. Thereafter, 1.13 kg of dextrin (Pine-Dex #3 (trade name); manufactured by Matsutani Chemical Industry Co., Ltd.) was added thereto, and the obtained mixture was further stirred for 20 minutes. This dispersion-dissolved solution was subjected to a grinding treatment by two passes at a pressure of 15 MPa using a high-pressure homogenizer (manufactured by APV). Thereafter, the resultant was spray-dried under conditions of an inlet temperature of 90° C. to 100° C. and an outlet temperature of 70° C. to 80° C., using a spray dryer, so as to obtain a readily dispersible cellulose composite γ. A dispersion of the readily dispersible cellulose composite γ had an average particle size of 8 μm and a TI value of 6.1.

Production Example 4

A commercially available DP pulp (with an average degree of polymerization of 850) was cut, and the cut pulp was then subjected to a hydrolysis treatment in 1% hydrochloric acid at 110° C. for 60 minutes. The obtained acid-insoluble residue was filtrated and washed with pure water, so as to obtain a wet cake of crystalline cellulose. Carboxymethylcellulose sodium was added to the solid content of the above described wet cake to achieve a ratio of the cellulose/the carboxymethylcellulose sodium of 89/11 (the mass ratio of solid contents). The obtained mixture was kneaded and ground using a kneader. The obtained wet cake of cellulose composite was added to 80° C. hot water to achieve a solid content concentration of 15% by mass, and it was then dispersed therein. Thereafter, dextrin was added to the dispersion to achieve a ratio of the cellulose/the dextrin of 60/40 (the mass ratio of solid contents), and the thus obtained mixture was further stirred for 20 minutes. The dispersion-dissolved solution was subjected to a grinding treatment by one pass at a pressure of 15 MPa using a high-pressure homogenizer (manufactured by APV). Thereafter, the resultant was spray-dried under conditions of an inlet temperature of 90° C. to 100° C. and an outlet temperature of 70° C. to 80° C., using a spray dryer, so as to obtain a readily dispersible cellulose composite δ. A dispersion of the readily dispersible cellulose composite δ had an average particle size of 6 μm and a TI value of 8.5.

Preparation of Pigment-Dispersed Composition

Examples 5 to 8 and Comparative Examples 7 to 10

The readily dispersible cellulose composites obtained in Production Examples 1 to 4, and a cellulose composite α

(CEOLUS RC-591 (trade name), manufactured by Asahi Kasei Chemicals Corporation; having an average particle size of 21 μm and a TI value of 2.9 under the measurement conditions in the present invention), a cellulose composite β (CEOLUS RC-N81 (trade name), manufactured by Asahi Kasei Chemicals Corporation; having an average particle size of 38 μm and a TI value of 1.8 under the measurement conditions in the present invention) and a cellulose composite γ (a high dispersion stabilizer of the cellulose composite disclosed in Example 1 of JP 2006-296302 A (Publication 8), having an average particle size of 11 μm, and a TI value of 3.9) were used to produce pigment-dispersed compositions.

Deionized water was placed in a stainless steel container, and individual compositions were then added thereto to achieve the mass ratios of mixing compositions, as shown in Table 2. The obtained mixtures were each stirred at 1000 rpm for 30 minutes using a high-speed impeller stirrer (a high-speed disperser), so as to obtain pigment-dispersed compositions J1, J2, J3, J4, H1, H2, and H3. In Comparative Example 8, a cellulose composite δ had previously preliminarily been dispersed using Excel autohomogenizer (ED-7; manufactured by Nippon Seiki Co., Ltd.) at 15000 rpm for 5 minutes. Using the obtained dispersion, a pigment and the like were dispersed by a high-speed impeller stirrer (a high-speed disperser), so as to obtain a pigment-dispersed composition H4.

TABLE 2

| | | Example 5 J1 | Example 6 J2 | Example 7 J3 | Example 8 J4 | Comparative Example 7 H1 | Comparative Example 8 H2 | Comparative Example 9 H3 | Comparative Example 10 H4 |
|---|---|---|---|---|---|---|---|---|---|
| Composition [% by mass] | Deionized water | 24.5 | 24.5 | 24.5 | 24.5 | 24.5 | 24.5 | 24.5 | 25.5 |
| | Ethylene glycol | 6 | 6 | 6 | 6 | 6 | 6 | 6 | 6 |
| | Readily dispersible cellulose composite α | 1.5 | | | | | | | |
| | Readily dispersible cellulose composite β | | 1.5 | | | | | | |
| | Readily dispersible cellulose composite γ | | | 1.5 | | | | | |
| | Readily dispersible cellulose composite δ | | | | 1.5 | | | | |
| | Cellulose composite α | | | | | 1.5 | | | |
| | Cellulose composite β | | | | | | 1.5 | | 0.5 |
| | Cellulose composite γ | | | | | | | 1.5 | |
| | Hydroxyethylcellulose | 1 | 1 | 1 | 1 | 1 | 1 | 1 | 1 |
| | Antifoaming agent | 2 | 2 | 2 | 2 | 2 | 2 | 2 | 2 |
| | Carbon black | 2 | 2 | 2 | 2 | 2 | 2 | 2 | 2 |
| | Titanium white | 63 | 63 | 63 | 63 | 63 | 63 | 63 | 63 |

Preliminary dispersion performed

The evaluation of these pigment-dispersed compositions is shown in Table 3.

TABLE 3

| | | J1 | J2 | J3 | J4 | H1 | H2 | H3 | H4 |
|---|---|---|---|---|---|---|---|---|---|
| Evaluation results | Storage stability | ○ | ○ | ○ | ◎ | X | X | Δ | ○ |
| | Redispersibility | ◎ | ◎ | ◎ | ◎ | Δ | Δ | ○ | ○ |
| | Prevention of color separation | ○ | ○ | ○ | ○ | X | X | X | Δ |

The pigment-dispersed compositions J1 to J4 were good in terms of both storage stability and redispersibility. On the other hand, in all of the pigment-dispersed compositions H1 to H3, the sedimentation and/or separation of the pigment occurred. Since the pigment-dispersed composition H3 had high dispersibility that was able to impart sufficient sedimentation stability in the field of food products, its storage stability and redispersibility were better than those of H1 and H2. However, they were not completely returned to the state before the storage. H1, H2 and H3 each used a cellulose composite. However, since these compositions could not be sufficiently dispersed by the above described high-speed impeller stirrer used as a disperser, they could not sufficiently exhibit their functions. Since preliminary dispersion was performed on H4, its storage stability was equivalent to that in the case of using the readily dispersible cellulose composite of the present invention. However, its color separation-preventing function was somewhat poor, and color unevenness occurred.

Example 9 and Comparative Example 11

Using the pigment-dispersed composition J4 obtained in Example 8, an aqueous coating composition was produced with the below-mentioned composition, and was then evaluated. A coating film obtained by applying the coating composition to a calcium silicate test plate using an applicator and then drying it in a 110° C. oven for 1 hour was evaluated. Individual components were mixed by stirring a mixture of the components using a high-speed impeller stirrer at 1000 rpm for 30 minutes. In Comparative Example 11, an aqueous coating material was produced in the same manner as in Example 9 with the exception that the pigment-dispersed composition J4 was replaced with the pigment-dispersed composition H1, and it was then evaluated. The results are shown in Table 4.

| | |
|---|---|
| J4 or H1 (a pigment-dispersed composition) | 60 parts by mass |
| Acrylic resin emulsion (synthetic resin; solid content: 40%) [E410 (manufactured by Asahi Kasei Chemicals Corporation)] | 100 parts by mass |
| B. B. P. (a plasticizer) | 2 parts by mass |
| Texanol (a film-forming aid) | 5 parts by mass |

TABLE 4

| | | Example 9 | Comparative Example 11 |
|---|---|---|---|
| Evaluation of coating material | Storage stability | ◎ | X |
| | Redispersibility | ◎ | Δ |
| | Sagging (coatability) | ○ | Δ |
| Evaluation of coating film | Popping (smoothness) | ○ | Δ |
| | Salt tolerance | ○ | Δ |
| | Weather resistance (hardness test) | ○ | Δ |
| | Weather resistance (adhesiveness test) | ○ | Δ |

When compared with Example 9, in Comparative Example 11, not only storage stability and redispersibility were poor as same with the used pigment-dispersed composition, but coatability and the like were also degraded.

Example 10 and Comparative Example 12

An aqueous coating material was produced with the below-mentioned composition. Individual components were mixed by stirring a mixture of the components using a high-speed impeller stirrer at 1000 rpm for 30 minutes. Comparative Example 12 was carried out in the same manner as in Example 10 with the exception that the readily dispersible cellulose composite γ of Example 10 was replaced with the cellulose composite β (CEOLUS RC-N81 (trade name), manufactured by Asahi Kasei Chemicals Corporation; having an average particle size of 38 μm and a TI value of 1.8 under the measurement conditions in the present invention). A coating film produced by applying the obtained coating composition to a commercially available test plate and then treating it at 140° C. for 20 minutes was evaluated. The evaluation results are shown in Table 5.

| | |
|---|---|
| Polyester resin emulsion (solid content: 30% by mass) [Elitel KZA-1734 (manufactured by Unitika, Ltd.)] | 93 parts by mass |
| Pigment-dispersed paste [SF611 White (manufactured by Toyo Ink MFG, Co., Ltd.); solid content: 73%] | 13 parts by mass |
| Hardening agent (solid content: 80% by mass) [Polyamine hardening agent (Ancamide 502)] | 15 parts by mass |
| Readily dispersible cellulose composite γ | 1 part by mass |

TABLE 5

| | | Example 10 | Comparative Example 12 |
|---|---|---|---|
| Evaluation of coating material | Storage stability | ○ | X |
| | Redispersibility | ◎ | X |
| | Sagging (coatability) | ○ | Δ |
| Evaluation of coating film | Popping (smoothness) | ○ | X |
| | Salt tolerance | ○ | X |
| | Weather resistance (hardness test) | ○ | X |
| | Weather resistance (adhesiveness test) | ○ | X |

When compared with Example 10, in Comparative Example 12, not only storage stability and redispersibility were poor as same with the used pigment-dispersed composition, but seeding was also generated.

Example 11

An ink was produced by the below-mentioned method using the following mixing components.

| | |
|---|---|
| Pigment: a water dispersion of pink resin particles [SW-17 (manufactured by Sinloihi Co., Ltd.); solid content: 42%] | 8% by mass |
| Film-forming resin: a water dispersion of an acrylonitrile-butadiene copolymer [Nipol LX517A (manufactured by Zeon Corporation); solid content: 40%] | 60% by mass |
| Urea | 18% by mass |
| Dispersion stabilizer: a readily dispersible cellulose composite β | 2% by mass |
| Water (purified water) | 14% by mass |

The above described mixing components were successively added to a tank, while stirring the inside of the tank, and they were then mixed and stirred at 1500 rpm using a high-speed impeller stirrer until they became homogeneous. Thereafter, the obtained mixture was filtrated with a 1-μm bag filter, so as to produce an ink.

Example 12

An ink was produced by the below-mentioned method using the following mixing components.

| | |
|---|---|
| Pigment: a water dispersion of orange resin particles [SW-14 (manufactured by Sinloihi Co., Ltd.); solid content: 42%] | 4% by mass |
| Film-forming resin: a water dispersion of a styrene-butadiene copolymer resin [Nipol LX438C (manufactured by Zeon Corporation); solid content: 45%] | 60% by mass |
| Dispersion stabilizer: a readily dispersible cellulose composite γ | 1% by mass |
| Urea | 15% by mass |
| Water (purified water) | 20% by mass |

The above described mixing components were successively added to a tank, while stirring the inside of the tank, and they were then mixed and stirred at 1500 rpm using a high-speed impeller stirrer until they became homogeneous. Thereafter, the obtained mixture was filtrated with a 1-μm bag filter, so as to produce an ink.

Comparative Example 13

An ink was produced by the same manner as in Example 12 with the exception that a cellulose composite α (CEOLUS RC-591 (trade name), manufactured by Asahi Kasei Chemicals Corporation; having an average particle size of 21 μm and a TI value of 2.9 under the measurement conditions in the present invention) was used instead of the readily dispersible cellulose composite γ of Example 12. In Comparative Example 13, a large amount of residue remained on the bag filter. The thus obtained inks were evaluated by the above described method. The results are shown in Table 6.

TABLE 6

| | | Example 11 | Example 12 | Comparative Example 13 |
|---|---|---|---|---|
| Evaluation results | Ink viscosity | 22 | 38 | 19 |
| | Stability over time | ◎ | ◎ | Δ |
| | Viscosity stability over time | ◎ | ◎ | ○ |

When compared with the ink of Comparative Example 13, the inks of Examples 11 and 12 were excellent in terms of stability over time and viscosity stability over time. This is because, since the cellulose composite could not sufficiently be dispersed and it remained on the bag filter in Comparative Example 13, its functions could not be exhibited.

INDUSTRIAL APPLICABILITY

The composition of the present invention has good storage stability, and when it is used as a coating material, it can be applied by spray coating. Since the present composition causes slight sagging and popping and it is suitable for wet-on-wet coating, it can be preferably used as a coating material, and particularly, a coating material used in the topcoating and primer surfacer of automobiles.

The invention claimed is:

1. A composition comprising:

100 parts by mass of a pigment, 0.01 to 50 parts by mass of a cellulose composite, a synthetic resin, a hardening agent, and water;

wherein the composition has a solid content of more than 25% by mass and a viscosity of 30 mPa·s or more, and;

wherein the cellulose composite contains 0.5% to 50% by mass of a hydrophilic polymer having an acid value of 2.0 or more and a weight-average molecular weight of $1\times10^3$ to $1\times10^7$ and 50% to 99.5% by mass of a crystalline cellulose, and the average particle size of the cellulose composite is 10 μm or less.

2. The composition according to claim 1, wherein the synthetic resin is an anionic synthetic resin.

3. The composition according to claim 1, wherein the synthetic resin is a polyester resin and the hardening agent is a melamine resin.

4. The composition according to claim 1, wherein the average particle size of the cellulose composite according to claim 1 is 10 μm or less when measured in the form of a water dispersion of the cellulose composite having a solid content concentration of 1% that is prepared by dispersing the cellulose composite in water using a propeller stirrer equipped with four paddle blades each having a radius of 4 cm at 25° C. at 500 rpm for 20 minutes, and the thixotropic index (TI value) of the cellulose composite is 4 or more when measured in the form of a water dispersion of the cellulose composite prepared under the same conditions as described above except that the solid content concentration is set at 2%.

5. The composition according to claim 4, comprising 50 to 3000 parts by mass of a dispersion aid with respect to 100 parts by mass of a cellulose composite.

6. The composition according to claim 5, further comprising a synthetic resin and an additive.

7. The composition according to claim 6, wherein the synthetic resin is a film-forming resin.

8. A coating method comprising performing a multilayer coating by wet-on-wet coating and then performing baking, wherein the composition according to claim 1 is used for a lower layer and/or an upper layer.

9. The coating method according to claim 8, which is a three-coat one-bake coating.

10. A coating additive comprising a cellulose composite, wherein the average particle size of the cellulose composite is 10 μm or less when measured in the form of a water dispersion of the cellulose composite having a solid content concentration of 1% that is prepared by dispersing the cellulose composite in water using a propeller stirrer equipped with four paddle blades each having a radius of 4 cm at 25° C. at 500 rpm for 20 minutes, the cellulose composite contains 0.5% to 50% by mass of a hydrophilic polymer having an acid value of 2.0 or more and a weight-average molecular weight of $1\times10^3$ to $1\times10^7$, and 50% to 99.5% by mass of a crystalline cellulose, and the thixotropic index (TI value) of the cellulose composite is 4 or more when measured in the form of a water dispersion of the cellulose composite prepared under the same conditions as described above except that the solid content concentration is set at 2%.

* * * * *